United States Patent [19]
Curtis et al.

[11] Patent Number: 5,848,938
[45] Date of Patent: Dec. 15, 1998

[54] TWIN MASS FLYWHEEL

[75] Inventors: Anthony John Curtis, Leamington Spa; Rober John Murphy, Bishops Tachbrook, both of Great Britain

[73] Assignee: Automotive Products, PLC, Leamington Spa, England

[21] Appl. No.: 776,475
[22] PCT Filed: May 31, 1996
[86] PCT No.: PCT/GB96/01282
  § 371 Date: Jan. 17, 1997
  § 102(e) Date: Jan. 17, 1997
[87] PCT Pub. No.: WO96/38681
  PCT Pub. Date: Dec. 5, 1996

[30] Foreign Application Priority Data

Jun. 1, 1995 [GB] United Kingdom ........ 95110880

[51] Int. Cl.$^6$ ............................................. F16D 3/14
[52] U.S. Cl. .................. 464/66; 192/212; 192/213.22
[58] Field of Search ............................. 464/64, 66, 68; 192/211, 212, 213, 213.2, 213.21, 213.22, 213.3, 213.31, 214, 214.1; 74/574

[56] References Cited

U.S. PATENT DOCUMENTS

| | | | |
|---|---|---|---|
| 2,101,297 | 12/1937 | Swennes | 192/212 |
| 4,433,770 | 2/1984 | Loizeau et al. | 192/213.22 X |
| 4,467,905 | 8/1984 | Takeuchi | 192/214 |
| 4,679,678 | 7/1987 | Habel, Jr. et al. | 192/212 X |
| 4,747,801 | 5/1988 | Chasseguet et al. | 464/66 |
| 4,959,039 | 9/1990 | Naudin | 464/66 |
| 5,380,248 | 1/1995 | Kraus et al. | 464/66 |
| 5,557,984 | 9/1996 | Cooke et al. | 74/574 |
| 5,634,851 | 6/1997 | Albers et al. | 192/212 X |

*Primary Examiner*—Randolph A. Reese
*Assistant Examiner*—Eileen A. Dunn
*Attorney, Agent, or Firm*—Paul E. Milliken; Lee A. Germain

[57] ABSTRACT

A twin mass flywheel comprising two co-axially arranged flywheel masses which are mounted for limited angular rotation in a drive and over-run direction relative to each other, and a plurality of pivotal linkages. Each pivotal linkage comprises a first link pivotally connected to one of the flywheel masses, a second link pivotally connected to the other of the flywheel masses and a pivot pivotally connecting the first and second links. The action of the links controls relative rotation of the flywheel masses, and the controlling action of the links is supplemented by one or more assister springs which operate over a significant proportion of the full drive direction range of relative rotation. The twin mass flywheel may further include end stops to positively limit relative rotation of the flywheel masses in the drive and over-run directions and may additionally include end stop resilient means which cushion the relative rotation of the flywheel masses just prior to contact of the end stops. A common support member may partially support both ends of the end stop resilient means and one end of the assister spring.

22 Claims, 7 Drawing Sheets

TWIN MASS FLYWHEEL

FIELD OF THE INVENTION

The present invention relates to a twin mass flywheel for transmitting torque and absorbing or compensating for torsional vibrations such as can arise in a vehicle transmission assembly.

SUMMARY OF THE INVENTION

More particularly the invention relates to a link-type twin mass flywheel comprising two co-axially arranged flywheel masses which are mounted for limited angular rotation relative to each other; and a plurality of pivotal linkages comprising a first link pivotally connected to one of the flywheel masses, a second link pivotally connected to the other of the flywheel masses, and a pivot for pivotally connecting the first and second links, in which the action of the links controls relative rotation of the flywheel masses.

It is the object of the present invention to provide an improved form of link-type twin mass flywheel.

Thus according to the present invention there is provided a link-type twin-mass flywheel in which the controlling action of the links is supplemented by one or more assister springs which operate over a significant proportion (e.g. the majority) of the full drive direction range of relative rotation.

In such a link-type twin mass flywheel the circumferentially acting springs come into operation in at least one of the following conditions:

a) between 0% and 60% of the total relative rotation of the flywheel masses in the drive direction and in particular between 0% and 50% of the total relative rotation of the flywheel masses in the drive direction. e.g. typically 25%.

b) between 0 degrees and 12 degrees of relative rotation of the flywheel masses in the drive direction. e.g. typically 7 degrees.

Typically the total possible assister spring compression is greater than 10 degrees of relative rotation of the flywheel masses e.g. typically 20 degrees of relative rotation of the flywheel masses.

The total assister spring rate may be less than 20 Nm per degree of relative rotation of the flywheel masses e.g. typically 12 Nm per degree of relative rotation of the flywheel masses.

Also for a given engine installation at the maximum deflected relative rotational position of the flywheel masses at a steady engine speed, further significant deflection of the assister springs is still possible. This further deflection is used to accommodate relative rotation occurring during transient engine conditions e.g. during engine start.

BRIEF DESCRIPTION OF THE DRAWINGS

The invention shall now be described, by way of example only, with reference to the accompanying drawings in which.

DESCRIPTION OF THE PREFERRED EMBODIMENTS

Figure 1:
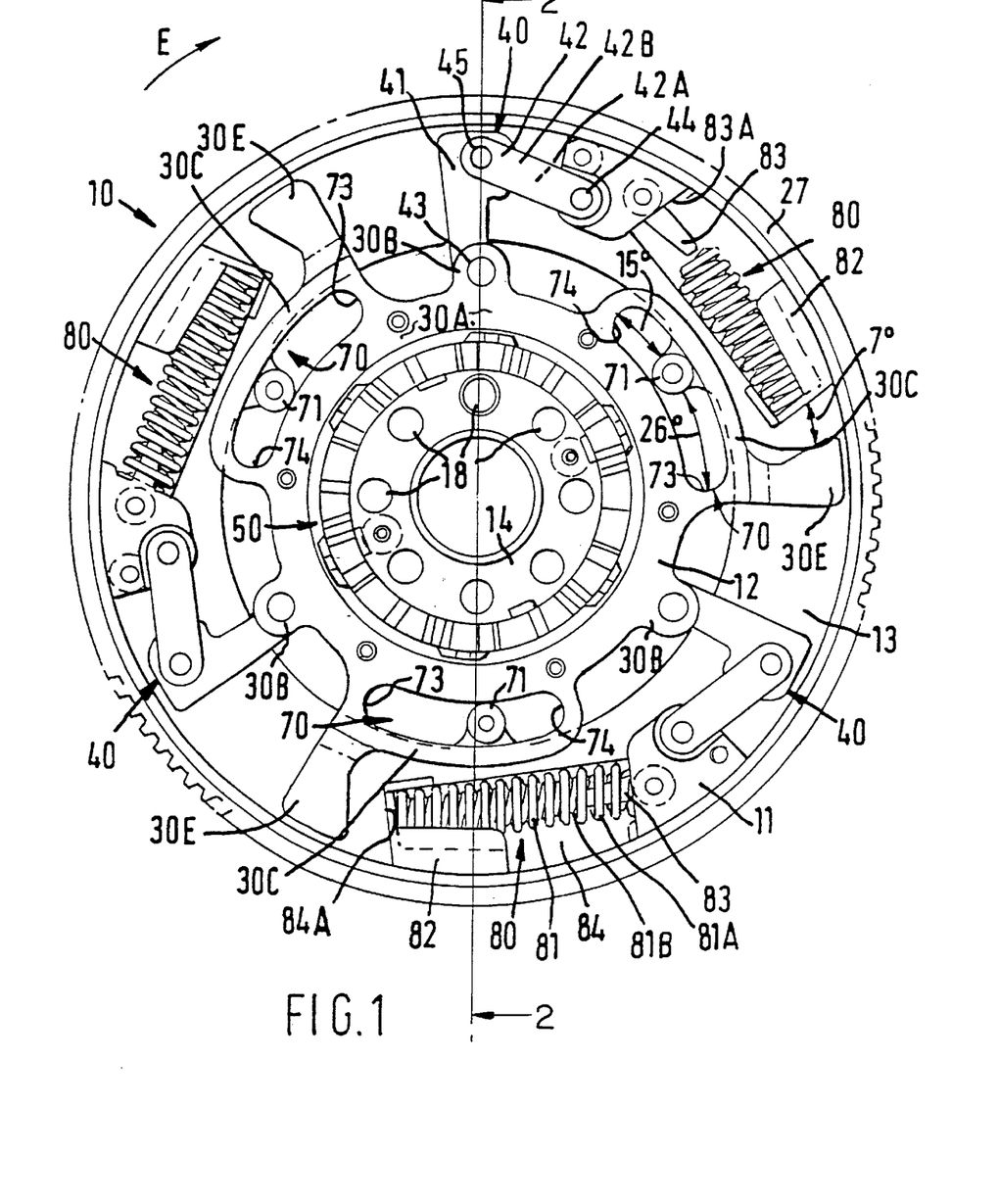
FIG. 1 is an axial cut away view of a link-type twin mass flywheel according to the present invention taken in the direction B of FIG. 2.
Figure 2:
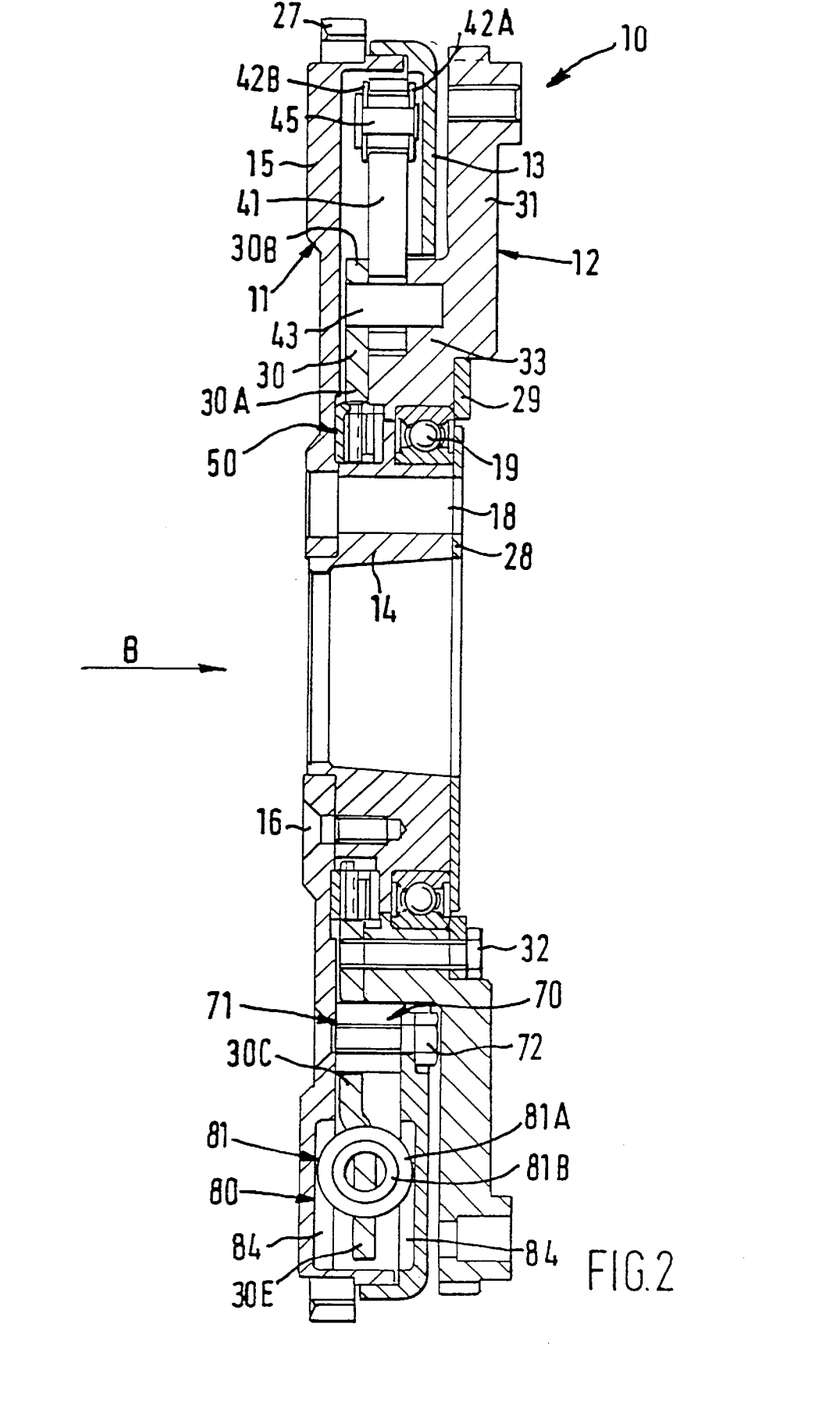
FIG. 2 is a radial composite cross section taken along the line 2—2 of FIG. 1 without showing shoe 82 for clarity.

With reference to FIGS. 1 and 2 there is illustrated a link-type twin mass flywheel 10 which is formed from two flywheel masses 11 and 12.

One flywheel mass 11 (also known as an input flywheel mass) is fixed to a crankshaft (not shown) of an internal combustion engine by way of a central hub 14 and bolts (not shown) which pass through holes 18. In use a friction clutch (not shown) is secured to the second flywheel mass 12 (also known as an output flywheel mass) to connect the second flywheel mass with an associated gearbox (not shown).

Under normal drive and over-run conditions the twin mass flywheel 10 rotates in an clockwise direction in the view shown in FIG. 1 as indicated by arrow E.

The flywheel mass 11 comprises the central hub 14, a main housing plate 15, a cover plate 13 and a starter ring 27 which is welded to the main housing plate 15. An inner bearing retaining plate 28 is fixed to the hub 14 by rivets (not shown) to retain a bearing 19 on which second flywheel mass 12 is mounted. Housing plate 15 is fixed to central hub 14 by screws 16.

The second flywheel mass 12 comprises a flywheel plate 31 with an outer bearing retaining plate 29 and pivot plate 30 both fixed to the flywheel plate 31 by bolts 32.

Pivot plate 30 has an annular inner portion 30A with plurality of lugs 30B which form part of pivots 43, a plurality of slotted lugs 30C which form part of an end stop unit 70, and a plurality of lugs 30E which act on respective spring units 80.

Relative rotation between two flywheel masses 11 and 12 is primarily controlled by a plurality of pivotal linkages 40. A plurality of assister spring units 80, a friction damping device 50 and end stop units 70 act in parallel with the pivotal linkages 40 to help in controlling the relative rotation of the two flywheel masses 11 and 12 at predetermined specific relative angular positions or over predetermined specific angular ranges.

Each pivotal linkage 40 comprises a first link 41 pivotally mounted between a centre hub portion 33 of the flywheel plate 31 and pivot plate 30 by way of a first pivot 43 and a second link 42 (in the form of a parallel pair of arms 42A and 42B pivotally mounted on the flywheel mass 11 by way of a second pivot 44. The two links 41 and 42 are pivotally connected to each other by means of a third pivot 45. It will be noted from FIG. 1 that the first pivot 43 is positioned radially inwardly of the second and third pivots 44 and 45. The first link 41 is formed as a bob weight mass.

Under no-load conditions with the clutch disengaged, centrifugal force acts on the pivotal linkages 40 and particularly on the first link 41 and urges the linkages in a radially outward direction with pivot 45 adopting a position radially outboard of pivot 43 as shown in FIG. 1 (this position is regarded as the neutral position between the drive and over-run directions of relative rotation of the flywheel masses i.e. the position adopted by the linkages then the twin mass flywheel is rotating and transmitting zero torque). At higher rotational speeds the centrifugal force is greater and whilst this does not affect the configuration under no-load conditions it greatly affects the force required to move the flywheel mass 12 relative to the flywheel mass 11 i.e. the flywheel torsional stiffness.

If the clutch is engaged and power is transmitted in the drive direction from flywheel mass 11 to flywheel mass 12 there is a tendency for the two masses to rotate relative to each other (flywheel mass 11 rotates clockwise relative to flywheel mass 12 when viewing FIG. 1). At relatively low speeds when the influence of centrifugal force is smaller the flywheel masses move readily relative to each other i.e. the flywheel torsional stiffness is relatively low. However at relatively high speeds the influence of centrifugal force is much greater and relative rotation of the flywheel masses requires greater torque i.e. the flywheel torsional stiffness is relatively high. Thus the flywheel torsional stiffness is speed sensitive.

If the clutch is engaged and power is transmitted in the over-run direction from flywheel mass 12 to flywheel mass 11 the effects are similar to the above except that the direction of relative rotation is reversed (flywheel mass 11 rotates anticlockwise relative to flywheel mass 12 when viewing FIG. 1) and in the embodiment shown in FIG. 1 the first link 41 folds between the second link 42 ie. between arms 42A and 42B.

Thus the controlling influence of the pivotal linkages is operable at any rotational speed of the twin mass flywheel and also any relative rotation position of the flywheel masses.

In accordance with the present invention the assister spring units 80 help in controlling the relative rotation of the twin mass flywheel over a limited angular range in the drive direction.

Each assister spring unit 80 is mounted between housing plate 15 and cover plate 13 and consists of an assister spring 81 and a shoe 82. The assister spring 81 consists of two concentric springs 81A and 81B both mounted between third abutments in the form of a shoulder 83A of a pin 83 at one end of assister spring 81 and the shoe 82 at the other end. In an alternative embodiment the assister spring 81 could consist of a single spring or some other type of resilient means e.g. a block of elastomeric material.

The pin 83 is fixed rotationally fast with the flywheel mass 11. The axial sides of the shoe 82 fit into pockets 84 in the housing plate 15 and cover plate 13, in such a manner to ensure the shoe is axially and radially fast but circumferentially movable to a limited extent with respect to flywheel mass 11. When installed one end of the shoe 82 abuts the end 84A of the pockets 84 and the assister spring 81 is under a relatively small amount of compression.

Each end stop unit 70 consists of a sleeve 71 fixed between housing plate 15 and cover plate 13 by a screw and nut 72 which is positioned in the slotted lug 30C.

The twin mass flywheel is required to transfer engine torque to the associated gearbox. The term "engine torque" means the torque which is produced and is also maintainable by the engine at a particular speed. These engine torques are produced when the engine is running above its idle speed and act only in the drive direction. Engine torque can vary between zero (e.g. engine running at idle speed, clutch disengaged) and the maximum engine torque figure.

Furthermore the twin mass flywheel is also required to transfer transient torques. Such transient torques are produced as a result of inertia loads and can not be maintained for very long periods. Furthermore transient torques can act in both the drive or over-run directions and in particular can be higher than the maximum engine torque figure.

Under conditions of relatively low rotational speed and high engine torque (necessary in the drive direction) relative rotation between flywheel mass 11 and 12 occur until a fourth abutment in the form of lug 30E contacts shoe 82 (in this case after 7 degrees of relative rotation from the neutral position). Typically such conditions might occur when an associated vehicle is moving relatively slowly (say 5 kph) with the clutch fully engaged and the engine throttle is suddenly fully opened resulting in the engine speed progressively increasing as the speed of the vehicle increases. Under these conditions each assister spring could initially be partially compressed by lug 30E moving shoe 82 and subsequently as the engine speed rises the centrifugal forces acting on the bob weights progressively return the flywheel masses to near their neutral position and the assister spring controlling influence ceases as lug 30E disengages shoe 82. It should be noted that it is particularly advantageous to have the assister springs operating at relatively low engine speeds since the cyclic variations in torque produced by an associated internal combustion engine are more pronounced at low speeds and the assister spring helps to control these cyclic variations in torque as well as controlling the average underlying maintainable engine torque.

Under extreme transient torque drive conditions relative rotation of the flywheel masses causes the shoe 82 to move in pockets 84 and compress the spring pack 81 until sleeve 71 contacts one end 73 of slotted lug 30C whereupon relative rotation stops (in this case after a total of 26 degrees of relative rotation from the neutral position).

Typically such extreme transient drive conditions might occur at very low rotational speeds and very high torque loads, for example during engine start or engine stop when the flywheel speed is below normal idle speed inertia torque loads can be generated which are far in excess of the maximum engine torque produceable by the engine.

Under extreme transient torque over-run conditions of very low rotational speed and very high torque loads in the over-run direction (such as engine start and engine stop), relative rotational between flywheel mass 11 and 12 occur until sleeve 71 contacts the other end 74 of slotted lug 30C whereupon relative rotation stops (in this case after a total of 15 degrees of relative rotation from the neutral position).

The end stop units 70 are arranged to prevent the first, second and third pivots 43, 44, and 45 of any linkage 40 becoming aligned and to ensure that the springs 80 are not overstressed.

The operation of the multi-plate friction damping device 50 is not part of the subject matter of this invention. A full description of its operation can be found in the Applicant's prior GB patent application 95 05750.1. It suffices to say that damping device 50 frictionally damps the relative rotation of flywheel masses 11 and 12.

FIGS. 3 to 6 show an alternative embodiment of a twin mass flywheel 110 according to the present invention in which components which fulfil substantially the same function as components in the twin mass flywheel 10 are numbered 100 greater.

Figure 3:
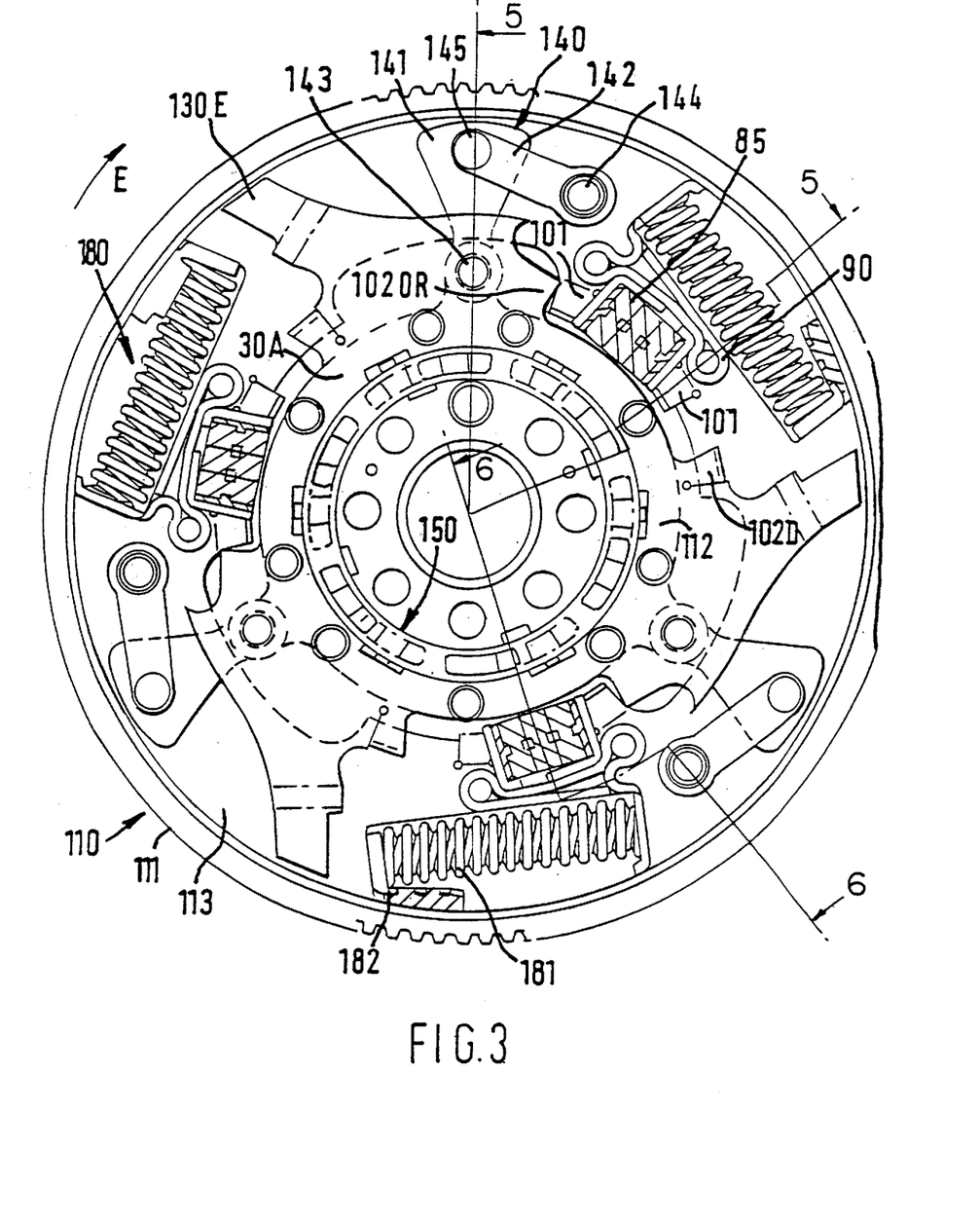
FIG. 3 is an equivalent view to FIGS. 1 of a second embodiment of a link type twin mass flywheel according to the present invention.

The main differences between twin mass flywheel 110 and 10 are as follows:

a) twin mass flywheel 110 incorporates end stop resilient means 85 which operate under extreme conditions of low rotational speed and high torque in the drive or over-run direction of relative rotation of the flywheel masses;

b) associated assister springs 181 and end stop resilient means 85 are partially supported by a common support member 90, and c) the end stop arrangement is modified.

Figure 7:
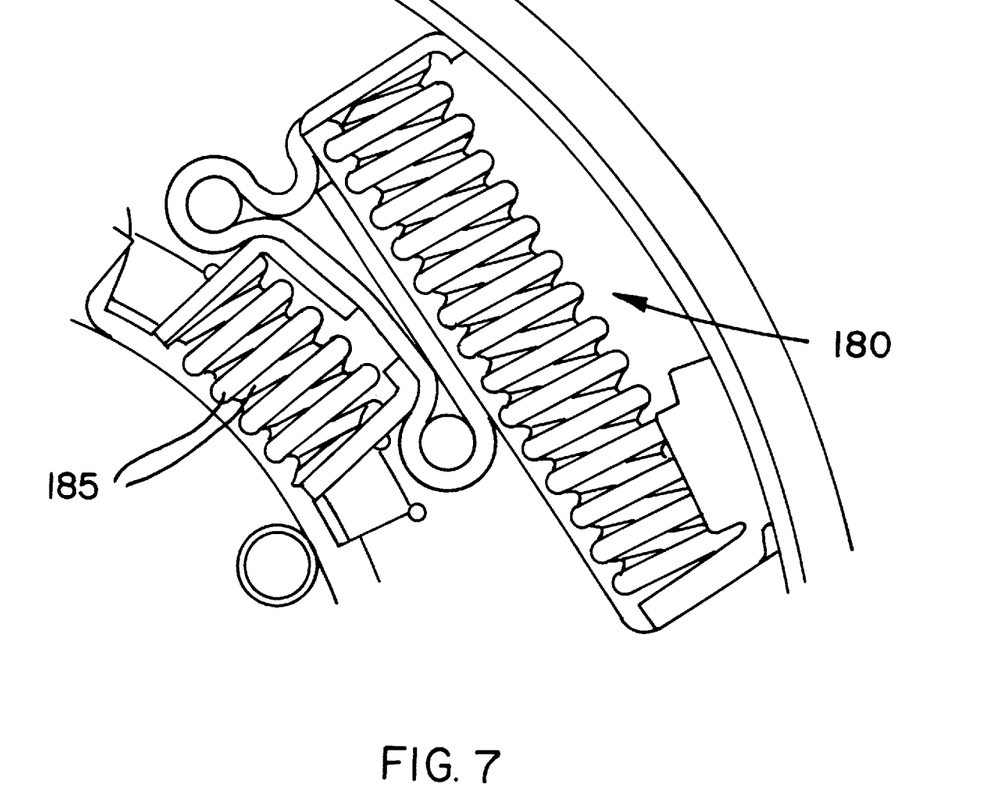
FIG. 7 is an embodiment that shows the end stop resilient means as a pair of concentric springs acting in parallel.

The twin mass flywheel 110 incorporates three end stop resilient means 85, each consisting of a resilient means 86 drive shoe 87D and an overrun shoe 87OR. In the example shown resilient means 86 comprises three elastomeric discs 86B bonded to each other in a stack and a metallic spacer 86A bonded to each end of the stack of elastomeric discs. In further embodiments each end stop resilient means may comprise other forms of elastomeric material, in particular a single block of elastomeric material or one or more metallic helically wound springs e.g. a pair of concentric springs 185 acting in parallel as shown in FIG. 7

Each end stop resilient means 85 is mounted between first abutments of flywheel mass 111 defined by the combination of a tab 101 of cover plate 113 and an end stop portion 91D,910R of the common support member 90.

Figure 4:
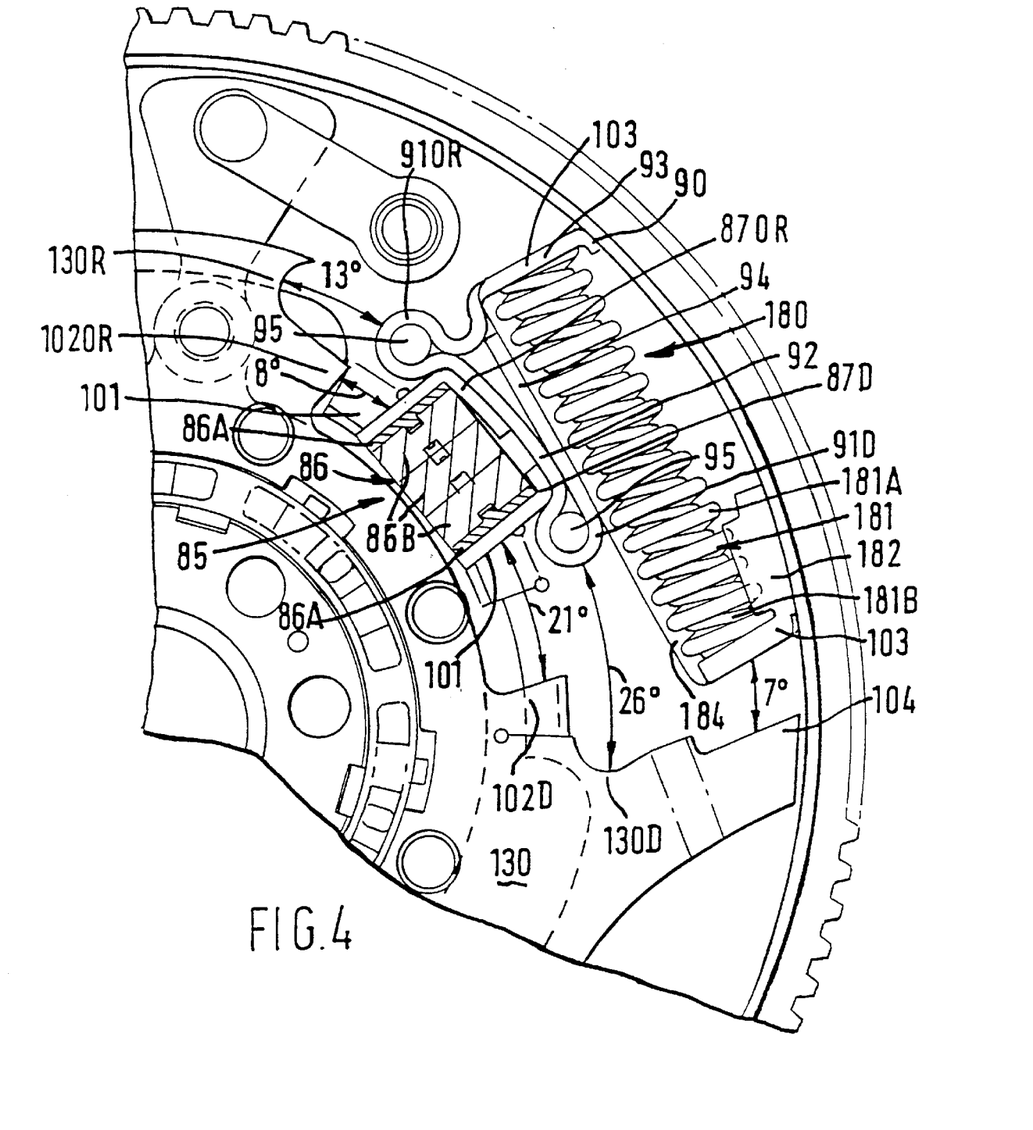
FIG. 4 is an enlarged view of part of FIG. 3.

Common support member 90 is made from a strip of steel which is subsequently bent into shape. The cross section profile of the common support member consists of substantially circular drive and overrun end stop portions 91D, 91OR joined by a shoe guide portion 92 and also an assister spring abutment 93 joined to over-run end stop portion 91OR and an assister spring guide portion 94 joined to drive end stop portion 91D.

Figure 5:
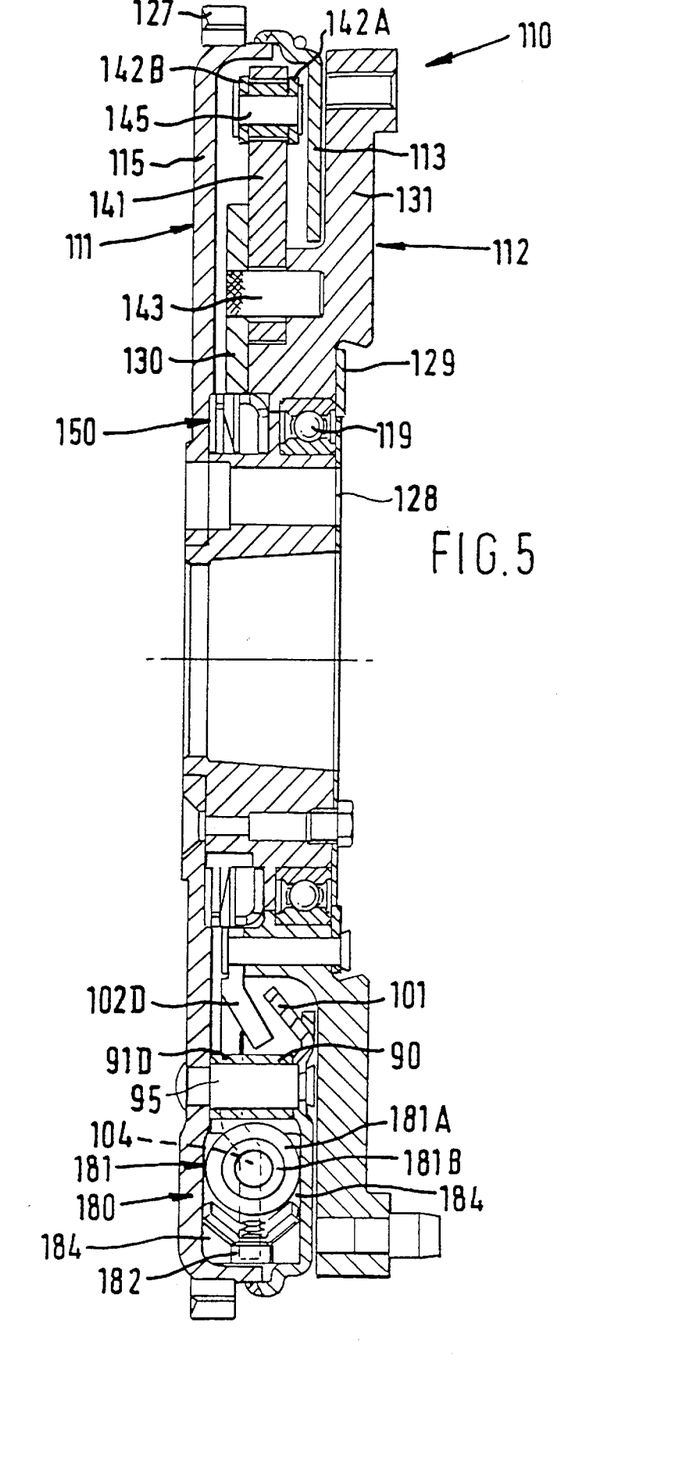
FIG. 5 is a cross section view taken along the line 5—5 of FIG. 3.
Figure 6:
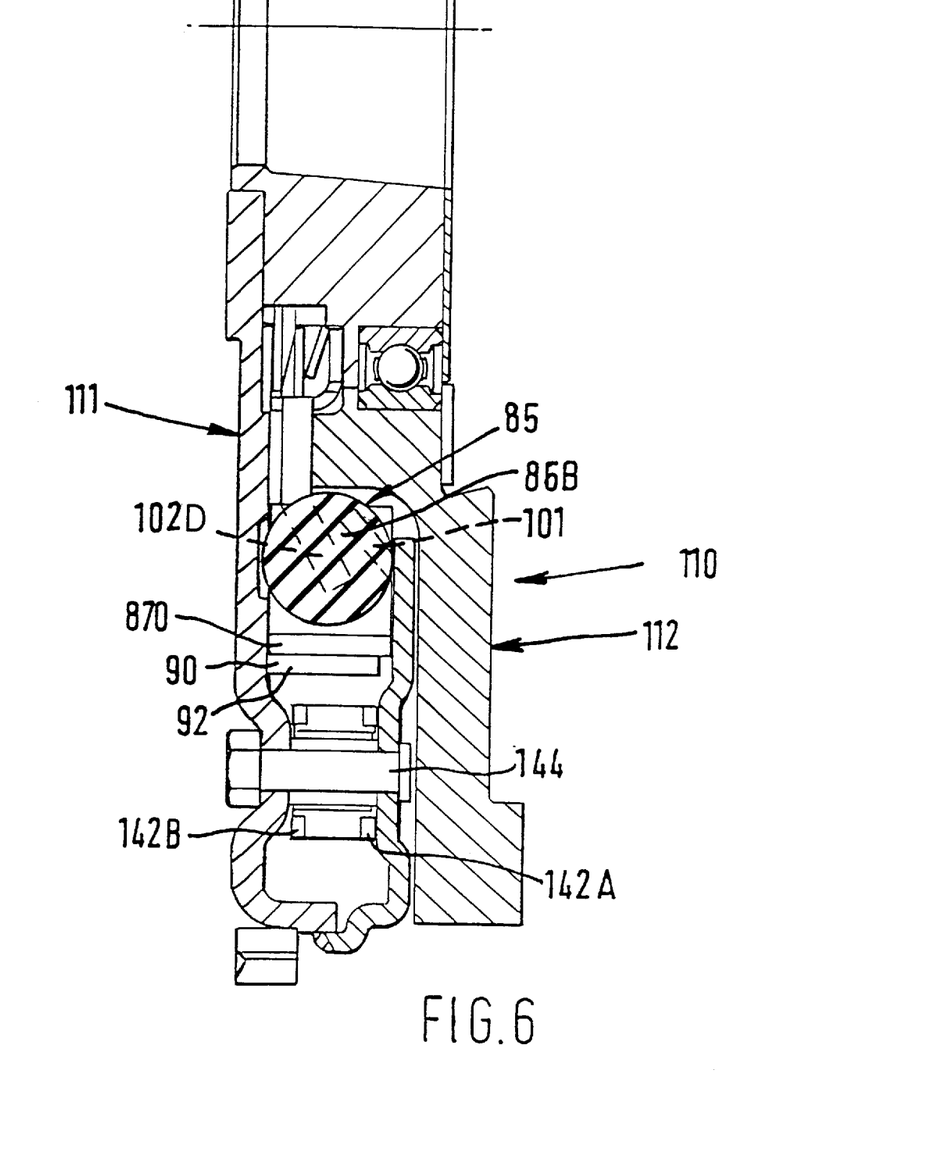
FIG. 6 is a cross section view taken along the line 6—6 of FIG. 3.

The common support member 90 is sandwiched between the cover plate 113 and main housing plate 115 with a fixing rivet 95 passing through aligned holes in the main housing plate 115, and cover plate 113 and each drive and over-run end stop portion 91. Thus each common support member is located by two fixing rivets 95.

Operation of the twin mass flywheel 110 is substantially the same as the operation of twin mass flywheel 10 with fourth abutment 104 acting to compress the assister spring under conditions of low engine speed and high engine torque.

However when the flywheel masses are approaching the limit of relative rotation in the drive direction under extreme transient torque drive conditions second drive abutments 102D on flywheel mass 112 contact corresponding drive shoes 87D and cause the resilient means 86 to be compressed. Subsequent further relative rotation causes drive end stop portion 130D of pivot plate 130 to contact drive end stop portion 91D of the common support member whereupon relative rotation ceases.

Sufficient relative rotation of the flywheel masses in the overrun direction under extreme transient torque over-run conditions will result in each second over-run abutment 1020R contacting corresponding over-run shoe 870R and causing the resilient means to compress until relative rotation is halted by over-run end stop portion 130R of pivot plate 130 contacting over-run end stop portion 910R of the common support member.

It can be seen from FIG. 4 that starting from the neutral position as the flywheel masses rotate relative to each other in the drive direction the assister spring engages after 7 degrees, the end stop resilient means engages after 21 degrees and the end stop engages after 26 degrees. Correspondingly as the flywheel masses rotate relative to each other in the over-run direction the end stop resilient means engages after 8 degrees and the end stop engages after 13 degrees.

It should be noted that the end stop resilient means therefore operates over five degrees (26-21) of relative rotation in the drive direction and five degrees (13-8) of relative rotation in the over-run direction. Further embodiments may have the end stop resilient means operating over a different range of rotation of the flywheel masses in the drive and over-run direction.

Note that the total travel of the end stop resilient means in the drive direction (5 degrees) is approximately 26% (i.e. less than 30%) of the total travel of the assister springs (19 degrees).

Contact between the end stops of the twin mass flywheel 10 or 110 causes noise and can also cause high stress in some components. Thus in the twin mass flywheel 110 the end stop resilient means act to cushion or in some circumstances eliminate contact between the end stops thus reducing noise and reducing stress in some components.

During compression of the end stop resilient means 85 the shoe guide portion 92 acts to guide the movement of the drive or over-run shoes 87D,870R.

Each spring unit 180 consists of a spring 181 and a shoe 182. Each spring 181 comprises a pair of concentric springs 181A and 181B both supported at each end by third abutments 103 in the form of an assister spring abutment 93 of the common support member 90 and an assister spring shoe 182.

In alternative embodiments the assister spring 181 could consist of a single spring or some other type of resilient means e.g. a block of resilient material.

The assister spring abutments 93 and shoes 182 fit into pockets 184 pressed into the cover plate 113 and housing plate 115. Loads generated by the assister springs 181 are transferred through the assister spring abutments 93 to the main housing plate 115 and cover plate 113 via contact with the ends of the pockets 184.

Under certain conditions the mid portions of the assister springs 181 can bow radially inwards and assister spring guide portions 94 are provided on the common support member 90 to counteract this tendency.

The common support members thus carry out several functions and can be made simply and cheaply.

Thus it can be appreciated that the assister springs 80, 180 are primarily designed to assist control of the flywheel masses under specific maintainable conditions of engine torque in the drive direction. This is quite distinct from the operation of the end stop resilient means 85 which are primarily designed to control very high transient torques produced as a result of inertia loads in both the drive and over-run directions often with the engine running at sub idle speeds.

This distinction is borne out by the fact that the combined spring rate of all the assister springs is significantly less than the combined spring rate of all the end stop resilient means when present. For example, a modern 2 liter sedan car producing say a maximum engine torque of 180 Nm which includes a link type twin mass flywheel of the type described might have a combined assister spring rate of less than 20 Nm per degree of relative rotation of the flywheel masses and if the flywheel included end stop resilient means the combined end stop resilient means spring rate may be in the range 40 Nm to 150 Nm per degree.

It can be advantageous to arrange the ratio of the combined assister spring rate to the combined spring rate of the end stop resilient means to be in the range 1:2 to 1:6.

Using the above example, whilst the vehicle can produce a maximum maintainable engine torque of 180 Nm, under transient conditions such as engine start-up and stop extreme transient torque levels of up to 1000 Nm can be achieved momentarily due to inertia loads and it is these extreme torque loads that are ultimately controlled by the end stops and end stop resilient means.

This contrasts with maintainable relatively low speed high engine torque conditions when the centrifugal effect on the bob weights is low and the relative rotation is controlled by a combination of the bob weights and the assister springs.

Also the end stop resilient means can operate as a result of rapidly reversing inertia loads. During for example engine start-up the flywheel masses may move rapidly from the full drive position to the full overrun position and back to the full drive position several times as the engine accelerates from stationary to engine idle speed. It can be particularly advantageous if the end stop resilient means are made from an elastomeric material. Such elastomeric materials have significantly more hysteresis than say an equivalent helically wound compression spring and they thus absorb some of the energy of the system when compressed. This means that subsequently when the twin mass flywheels begin to move towards the other extreme of relative rotation the kinematic energy is less and subsequent contact between end stops is reduced or eliminated.

It should be noted that even though the assister springs operates over the majority of the relative rotational movement in the drive direction, this does not necessarily mean that the assister springs operate over the majority of time when the associated engine is in the drive condition. This is because at mid to high engine speeds the bob weight effect is sufficient to maintain the twin mass flywheel at or near its neutral position and at relatively low engine speeds (say idle speed) with the clutch disengaged or an associated gearbox in neutral the engine torque fluctuations are not sufficient to move the twin mass flywheel far from its neutral position. Typically a vehicle might spend the majority of time at mid to high engine speeds or at idle with the clutch disengaged or with the gearbox in neutral.

In further embodiments it is possible to have any number of linkages in combination with any number of assister springs (i.e. not necessarily one assister spring with each linkage). Furthermore such embodiments may additionally have any number of end stop resilient means (i.e. not necessarily one end stop resilient means with each linkage).

We claim:

1. A twin mass flywheel comprising two co-axially arranged flywheel masses which are mounted for limited angular rotation in a drive and over-run direction relative to each other, and a plurality of pivotal linkages comprising a first link pivotally connected to one of the flywheel masses a second link pivotally connected to the other of the flywheel masses and a pivot pivotally connecting the first and second links, in which the action of the links controls relative rotation of the flywheel masses, and the controlling action of the links is supplemented by one or more assistor springs which operate over a significant proportion of the full drive direction range of relative rotation.

2. A twin mass flywheel as defined in claim 1 in which one or more assistor springs come into operation between 0% and 60% of the total relative rotation of the flywheel masses in the drive direction.

3. A twin mass flywheel as defined in claim 1 in which one or more assistor springs come into operation between 0 degrees and 12 degrees of relative rotation of the flywheel masses in the drive direction.

4. A twin mass flywheel as defined in claim 1 in which total possible spring compression of the assistor springs is greater than 10 degrees of relative rotation of the flywheel masses.

5. A twin mass flywheel as defined in claim 1 in which the combined spring rate of the assister springs is less than 20 Nm per degree of relative rotation of the flywheel masses.

6. A twin mass flywheel as defined in claim 1 in which each assistor spring consists of a pair of concentric springs acting in parallel.

7. A twin mass flywheel as defined in claim 1 which includes corresponding end stops on each flywheel mass to positively limit relative rotation of the flywheel masses in the drive and over-run directions and also includes end stop resilient means which cushion the relative rotation of the flywheel masses just prior to contact of the corresponding end stops.

8. A twin mass flywheel as defined in claim 7 in which each end stop resilient means acts to cushion the relative rotation of the flywheel in both the drive and over-run directions.

9. A twin mass flywheel as defined in claim 7 in which the combined spring rate of the end stop resilient means is in the range 40 Nm to 150 Nm per degree of relative rotation of the flywheel masses.

10. A twin mass flywheel as defined in claim 7 in which the ratio of the combined assister spring rate to the combined spring rate of the end stop resilient means is in the range 1:2 to 1:6.

11. A twin mass flywheel as defined in claim 7 in which the total travel of the end stop resilient means in the drive direction is less than 30% of the total travel of the assister springs.

12. A twin mass flywheel as defined in of claim 7 in which each end stop resilient means is mounted between first abutments on one flywheel mass and after a pre-determined amount of relative rotation in either of the drive and over-run directions second abutments on the other flywheel mass act to compress each end stop resilient means and thus cushion relative rotation of the flywheel masses.

13. A twin mass flywheel as defined in claim 12 in which each assistor spring is mounted between third abutments on said one flywheel and a fourth abutment on the said other flywheel mass acts on one end of the assistor spring to compress the assistor spring.

14. A twin mass flywheel as defined in claim 13 in which the first abutments of an end stop resilient means and a third abutment of an associated assistor spring are partially defined by a common support member.

15. A twin mass flywheel as defined in claim 14 in which the common support member also acts as part of the end stops to limit the relative rotation of the flywheel masses.

16. A twin mass flywheel as defined in claim 13 in which each common support member supports and guides shoes at opposite end of the associated end stop resilient means during compression of the end stop resilient means in either of the drive and over-run direction.

17. A twin mass flywheel as defined in claim 7 in which each end stop resilient means consists of a pair of concentric springs acting in parallel.

18. A twin mass flywheel as defined in claim 7 in which each end stop resilient means comprises at least one members of elastomeric material.

19. A twin mass flywheel as defined in claim 7 in which the combined spring rate of the or all end stop resilient means is significantly greater than the combined spring rate of the assistor springs.

20. A twin mass flywheel comprising two co-axially arranged flywheel masses which are mounted for limited angular rotation in a drive and over-run direction relative to each other, and a plurality of pivotal linkages comprising a first link pivotally connected to one of the flywheel masses a second link pivotally connected to the other of the flywheel masses and a pivot pivotally connecting the first and second links, in which the action of the links controls relative rotation of the flywheel masses, and the controlling action of the links is supplemented by one or more assister springs and is further supplemented by one or more end stop springs.

21. A twin mass flywheel comprising two co-axially arranged flywheel masses which are mounted for limited angular rotation in a drive and over-run direction relative to each other, and a first resilient means which operates over a significant proportion of full drive direction or over-run direction range of relative rotation and a second resilient means which operate towards the end of the full drive or over-run direction range of relative rotation in which a common support member partially supports both ends of the second resilient means and one end of the first resilient means.

22. A twin mass flywheel as defined in claim 21 which includes end stops to positively limit relative rotation of the flywheel masses in the drive and over-run directions and the common support member acts as part of the end stops.

* * * * *